United States Patent
Kida

(10) Patent No.: US 10,858,461 B2
(45) Date of Patent: Dec. 8, 2020

(54) THERMOPLASTIC ELASTOMER COMPOSITION AND MOLDED BODY THEREOF

(71) Applicant: Sumitomo Chemical Company, Limited, Tokyo (JP)

(72) Inventor: Katsuya Kida, Ichihara (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 0 days.

(21) Appl. No.: 16/737,398

(22) Filed: Jan. 8, 2020

(65) Prior Publication Data

US 2020/0140585 A1    May 7, 2020

Related U.S. Application Data

(62) Division of application No. 15/963,068, filed on Apr. 25, 2018, now Pat. No. 10,577,443.

(30) Foreign Application Priority Data

Apr. 28, 2017 (JP) ................. 2017-089357

(51) Int. Cl.
| | |
|---|---|
| *C08L 23/12* | (2006.01) |
| *C08F 110/06* | (2006.01) |
| *C08F 210/16* | (2006.01) |
| *C08K 3/22* | (2006.01) |
| *C08L 23/08* | (2006.01) |

(52) U.S. Cl.
CPC .......... *C08F 110/06* (2013.01); *C08F 210/16* (2013.01); *C08K 3/22* (2013.01); *C08L 23/0815* (2013.01); *C08L 23/12* (2013.01); *C08F 2500/07* (2013.01); *C08F 2500/12* (2013.01); *C08F 2500/17* (2013.01); *C08F 2500/21* (2013.01); *C08F 2800/10* (2013.01); *C08L 2205/02* (2013.01); *C08L 2205/035* (2013.01)

(58) Field of Classification Search
CPC ...... C08L 23/16; C08L 23/12; C08L 23/0815; C08L 2205/02; C08L 2205/035; C08F 210/06; C08F 210/16; C08F 2500/17; C08F 2500/08; C08F 2500/12; C08F 210/08; C08F 210/14; C08F 236/20; C08F 2500/07; C08F 2500/21; C08K 3/22

See application file for complete search history.

(56) References Cited

U.S. PATENT DOCUMENTS

| | | | |
|---|---|---|---|
| 6,001,933 A | 12/1999 | Tsuruoka et al. | |
| 2003/0059637 A1* | 3/2003 | Imai et al. | C08L 23/06 428/515 |
| 2005/0098448 A1* | 5/2005 | Blalock | G01N 27/125 205/775 |
| 2006/0211812 A1 | 9/2006 | Natsuyama et al. | |
| 2010/0016495 A1* | 1/2010 | Taniguchi | C08L 51/04 524/502 |
| 2010/0143651 A1 | 6/2010 | Silvis et al. | |
| 2015/0018474 A1 | 1/2015 | Nakajima | |

FOREIGN PATENT DOCUMENTS

| | | |
|---|---|---|
| EP | 1600480 A1 | 11/2005 |
| JP | 2007126531 A | 5/2007 |
| JP | 2009024054 A | 2/2009 |
| JP | 2009040042 A | 2/2009 |
| JP | 2013035888 A | 2/2013 |

OTHER PUBLICATIONS

European Search Report dated Sep. 28, 2018 in EP Application No. 18169072.8 (Partial).
Extended European Search Report dated Jan. 30, 2019 in EP Application No. 18169072.8.

* cited by examiner

*Primary Examiner* — Nathan M Nutter
(74) *Attorney, Agent, or Firm* — Panitch Schwarze Belisario & Nadel LLP

(57) ABSTRACT

A thermoplastic elastomer composition contains components (A) to (D), wherein the content of the component (A), (B), (C) and (D) is, respectively, 26% by weight or more and 59% by weight or less, 2% by weight or more and 9% by weight or less, 16% by weight or more and 61% by weight or less and 11% by weight or more and 56% by weight or less, when the total amount of the components (A) to (D) is 100% by weight, and the ratio of the content of the component (C) to the content of the component (D) is over 1 and 5 or less.

4 Claims, 1 Drawing Sheet

90 mm

Tensile test direction 45 mm

THERMOPLASTIC ELASTOMER COMPOSITION AND MOLDED BODY THEREOF

CROSS-REFERENCE TO RELATED APPLICATION

This application is a Divisional of U.S. patent application Ser. No. 15/963,068, filed Apr. 25, 2018, which claims priority under 35 U.S.C. § 119(b) to Japanese Patent Application No. 2017-089357, filed on Apr. 28, 2017, the disclosures of which are incorporated herein by reference in their entireties.

FIELD OF THE INVENTION

The present invention relates to a thermoplastic elastomer composition and a molded body thereof.

BACKGROUND OF THE INVENTION

Olefin-based thermoplastic elastomer compositions have been widely used in automobile interior parts, automobile exterior parts, electric parts, home electronics parts, furniture parts, footwear parts, and architectural parts.

In order to adapt to the required performance of each part, a composite molded body in which a molded body comprising a thermoplastic elastomer composition and a molded body comprising a material other than a thermoplastic elastomer composition are welded with each other is used in some cases as the part. Patent Document 1 describes a composite molded body in which a molded body comprising a thermoplastic elastomer composition containing a propylene-based polymer and an ethylene-propylene-based copolymer rubber and a molded body comprising a propylene-based polymer are welded with each other.

PRIOR ART DOCUMENT

Patent Document

[Patent Document 1] JP-A No. 2009-40042

SUMMARY OF THE INVENTION

Recently, parts which are usable in an extensive environment from low temperatures to high temperatures are required, and it is required for a molded body comprising a propylene-based polymer of a molded body comprising a thermoplastic elastomer composition to improve rigidity at high temperature, impact strength at low temperature and welding strength.

Under such circumstances, the problem to be solved by the present invention is to provide a thermoplastic elastomer composition capable of giving a molded body excellent in rigidity at high temperature, impact strength at low temperature, and welding strength to a molded body comprising a propylene-based polymer.

The present invention includes inventions described in the following [1] to [14].

[1] A thermoplastic elastomer composition comprising a component (A), a component (B), a component (C) and a component (D), wherein the content of the component (A) is 26% by weight or more and 59% by weight or less, the content of the component (B) is 2% by weight or more and 9% by weight or less, the content of the component (C) is 16% by weight or more and 61% by weight or less and the content of the component (D) is 11% by weight or more and 56% by weight or less when the total amount of the component (A), the component (B), the component (C) and the component (D) is 100% by weight, and the ratio of the content of the component (C) to the content of the component (D) is over 1 and 5 or less.

Component (A): a polymer comprising a monomer unit derived from propylene, wherein the number of a monomer unit derived from propylene is over 85% and 100% or less when the total number of all monomer units contained in the polymer is 100%, and the intrinsic viscosity ([CA]) is 1.05 dl/g or more.

Component (B): a copolymer comprising a monomer unit derived from ethylene and a monomer unit derived from at least one selected from the group consisting of propylene and α-olefins having a number of carbon atoms of 4 or more and 12 or less, wherein the number of a monomer unit derived from ethylene is 15% or more and less than 60% when the total number of all monomer units contained in the copolymer is 100%, and the intrinsic viscosity ([RB]) is 5.5 dl/g or more.

Component (C): a copolymer comprising a monomer unit derived from ethylene and a monomer unit derived from at least one selected from the group consisting of α-olefins having a number of carbon atoms of 5 or more and 12 or less, wherein the number of a monomer unit derived from ethylene is 83% or more and less than 93% when the total number of all monomer units contained in the copolymer is 100%.

The component (D): a copolymer comprising a monomer unit derived from ethylene and a monomer unit derived from at least one substance selected from the group consisting of propylene and α-olefins having a number of carbon atoms of 4 or more and 12 or less, wherein the number of a monomer unit derived from ethylene is 60% or more and less than 83% when the total number of all monomer units contained in the copolymer is 100%.

[2] The thermoplastic elastomer composition according to [1], wherein the melt flow rate of the component (C) measured at a temperature of 190° C. and a load of 21.18 N is 0.01 g/10 min or more and 2 g/10 min or less

[3] The thermoplastic elastomer composition according to [1] or [2], wherein the component (D) is a copolymer comprising a monomer unit derived from ethylene and a monomer unit derived from at least one selected from the group consisting of propylene and α-olefins having a number of carbon atoms of 4.

[4] The thermoplastic elastomer composition according to any one of [1] to [3], wherein the density of the component (D) is 0.850 g/cm or more and less than 0.865 g/cm$^3$.

[5] The thermoplastic elastomer composition according to any one of [1] to [4], wherein the melt flow rate of the component (D) measured at a temperature of 190° C. and a load of 21.18 N is 0.01 g/10 min or more and 0.7 g/10 min or less.

[6] The thermoplastic elastomer composition according to any one of [1] to [5], wherein the component (C) is a copolymer comprising a monomer unit derived from ethylene and a monomer unit derived from an α-olefin having a number of carbon atoms of 8.

[7] The thermoplastic elastomer composition according to any one of [3] to [6], wherein the component (D) is a copolymer comprising a monomer unit derived from ethylene and a monomer unit derived from an α-olefin having a number of carbon atoms of 4.

[8] The thermoplastic elastomer composition according to any one of [1] to [7], wherein the component (A) is a mixture comprising a polymer (A-1) having an intrinsic viscosity of over 0.7 dl/g and 1.1 dl/g or less and a polymer (A-2) having an intrinsic viscosity of over 1.1 dl/g and 10 dl/g or less.

[9] A process for producing the thermoplastic elastomer composition according to any one of [1] to [8], comprising a step of melt-kneading the component (A), the component (B), the component (C) and the component (D).

[10] A molded body comprising the thermoplastic elastomer composition according to any one of [1] to [8].

[11] A composite molded body in which a first molded body comprising a propylene-based polymer and a second molded body comprising a thermoplastic elastomer composition are welded with each other, wherein when the cross-sectional surface perpendicular to the welding surface is stained with a vapor of ruthenium tetraoxide, the stained domain satisfies the requirement (1);

Requirement (1): when the stained cross-sectional surface is observed with a transmission electron microscope, D7 is 115 nm or less, wherein D7 is the number-average circle-equivalent diameter of the stained domain in a square having a side of 4 μm around a point where the distance from the welded part is 7 μm in a vertical direction, wherein the square presents in the second molded body.

[12] The composite molded body according to [11], wherein when the cross-sectional surface perpendicular to the welding surface is stained with a vapor of ruthenium tetraoxide, the stained domain satisfies the following requirement (2);

Requirement (2): when the stained cross-sectional surface is observed with a transmission electron microscope, D200/D7 is 3.5 or more, wherein D200 is the number-average circle-equivalent diameter of the stained domain in a square having a side of 4 μm around a point where the distance from the welded part is 200 μm in a vertical direction, wherein the square present in the second molded body.

[13] The composite molded body according to [11] or [12], wherein the first molded body and the second molded body are vibrated and welded with each other.

[14] An automobile interior part comprising the composite molded body according to any one of [11] to [13].

Effect of the Invention

According to the present invention, a molded body excellent in rigidity at high temperature, impact strength at low temperature and welding strength to a molded body comprising a propylene-based polymer can be obtained.

DETAILED DESCRIPTION OF THE INVENTION

Definition

Figure 1:
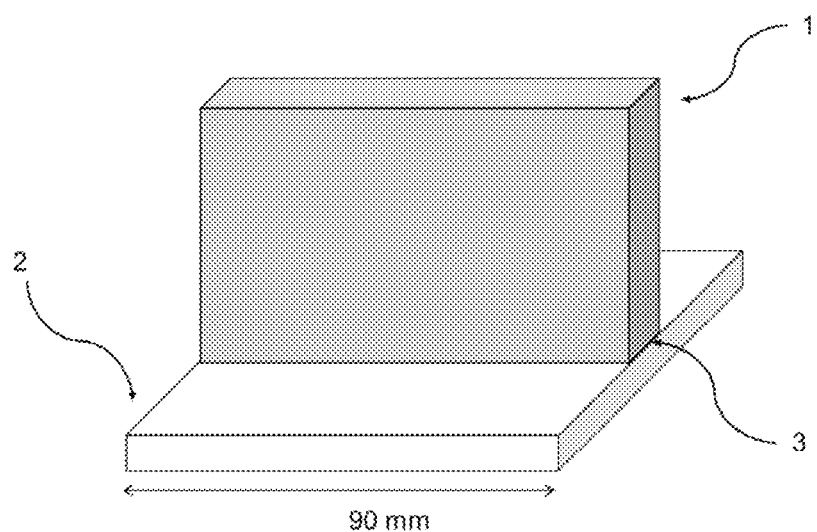
FIG. 1 is a schematic view of a composite molded body.

In the present specification, "propylene-based polymer" denotes a polymer having a monomer unit derived from propylene in which the number of the monomer unit derived from propylene is over 85% when the total number of all monomer units contained in the polymer is 100%.

In the present specification, "ethylene-based copolymer" denotes a polymer having a monomer unit derived from ethylene and a monomer unit derived from at least one monomer other than ethylene in which the content of the monomer unit derived from ethylene is 15% or more and 99% or less when the total amount of all monomer units contained in the polymer is 100%.

In the present specification, "α-olefin" denotes an olefin in which a carbon-carbon double bond is located at the α position.

In the present specification, "welding" means that a prescribed surface of a certain molded body and a prescribed surface of another molded body are melted to bond with each other.

In the present specification, "melting temperature" denotes the peak temperature which is the peak temperature of the highest endotherm peak among endothermic peaks in the melting curve measured by the following differential scanning calorimetry.

<Condition of Differential Scanning Calorimetry>

Using a differential scanning calorimeter, an aluminum pan having about 5 mg of an enclosed sample is (1) kept at 220° C. for 5 minutes, then, (2) cooled from 220° C. to −90° C. at a rate of 5° C./min, then, (3) heated from −90° C. to 200° C. at a rate of 5° C./min, under a nitrogen atmosphere. The differential scanning calorimetry curve obtained by calorimetry in step (3) is the melting curve.

In the present specification, the term "melt kneading" denotes kneading at least at a temperature at which a thermoplastic resin melts or at a higher temperature.

<Component (A)>

The component (A) is a polymer having a monomer unit derived from propylene in which the number of a monomer unit derived from propylene is over 85% and 100% or less when the total number of all monomer units contained in the polymer is 100%, and the intrinsic viscosity ([nA]) is 1.05 dl/g or more.

The component (A) may have a monomer unit derived from a monomer other than propylene. The monomer unit other than propylene includes ethylene and α-olefins having a number of carbon atoms of 4 to 12.

The component (A) includes a propylene homopolymer and a propylene random copolymer.

The propylene random copolymer includes (1) a propylene-ethylene random copolymer in which the number of a monomer unit derived from propylene is over 85% and 99.2% or less and the number of a monomer unit derived from ethylene is 0.8% or more and less than 15%, when the total number of a monomer unit derived from propylene and a monomer unit derived from ethylene is 100%;

(2) a propylene-ethylene-α-olefin random copolymer in which the number of a monomer unit derived from propylene is over 85% and 98.5% or less, the number of a monomer unit derived from ethylene is 0.15% or more and less than 15% and the number of a monomer unit derived from an α-olefin having a number of carbon atoms of 4 or more and 12 or less is 0.03% or more and less than 15%, where the total number of a monomer unit derived from propylene, a monomer unit derived from ethylene and a monomer unit derived from an α-olefin having a number of carbon atoms of 4 or more and 12 or less is 100%; or (3) a propylene-α-olefin random copolymer in which the number of a monomer unit derived from propylene is 92.5% or more and 99.8% or less and the number of a monomer unit derived from an α-olefin having a number of carbon atoms of 4 or more and 12 or less is 0.2% or more and 7.5% or less, when the total number of a monomer unit derived from propylene and a monomer unit derived from an α-olefin having a number of carbon atoms of 4 or more and 12 or less is 100%. The number of a monomer unit derived from ethylene and the number of a monomer unit derived from at least one selected from the group consisting of propylene and α-olefins having a number of carbon atoms of 4 or more can be determined by infrared spectroscopy.

The α-olefin having a number of carbon atoms of 4 or more and 12 or less includes 1-butene, 1-pentene, 1-hexene, 1-heptene, 1-octene, 1-nonene, 1-decene, 1-undecene, 1-dodecene, 3-methyl-1-butene, 3-methyl-1-pentene, 4-methyl-1-pentene, 2-ethyl-1-hexene, and 2,2,4-trimethyl-1-pentene. The α-olefin having a number of carbon atoms of 4 or more and 12 or less is more preferably an α-olefin having a number of carbon atoms of 4 or more and 10 or less, further preferably 1-butene, 1-hexene or 1-octene. The α-olefin having a number of carbon atoms of 4 or more may be used singly or two or more kinds of the α-olefins may be used in combination.

The component (A) can be obtained by polymerizing propylene in the presence of a catalyst for olefin polymerization. The catalyst for olefin polymerization includes complex type catalysts such as a Ziegler-Natta type catalyst, a metallocene type complex, and a non-metallocene type complex. The polymerization method includes a slurry polymerization method, a solution polymerization method, a bulk polymerization method, and a gas-phase polymerization method.

The intrinsic viscosity ([nA]) of the component (A) is preferably 1.05 dl/g or more and 2.0 dl/g or less, more preferably 1.07 dl/g or more and 1.8 dl/g or less, further preferably 1.1 dl/g or more and 1.6 dl/g or less, from the standpoint of impact strength at low temperature of a molded body.

In the present specification, the reduced viscosity is measured in tetralin at 135° C. using a Ubbelohde type viscometer, and the intrinsic viscosity is determined by an extrapolation method according to a calculation method described in "Polymer Solution, Polymer Experiment (Kobunshi Jikkengaku) 11" (published by Kyoritsu Shuppan Co., Ltd., 1982) p. 491.

The thermoplastic elastomer composition according to the present invention may contain only one kind of the component (A), or may contain two or more kinds of the component (A).

When the thermoplastic elastomer composition contains two or more kinds of the component (A), if [ηA] determined by substituting the intrinsic viscosity of each component (A) into the formula (1) is 1.05 dl/g or more, a mixture of the two or more kinds of the component (A) is "component (A)".

$$[\eta A]=\Sigma([\eta_{Ai}]\times m_{Ai})/\Sigma[m_{Ai}] \quad (1)$$

Component (A-i): a polymer comprising a monomer unit derived from propylene in which the number of the monomer unit derived from propylene is over 85% and 100% or less

[$\eta_{Ai}$]: intrinsic viscosity (dl/g) of component (A-i)
$m_{Ai}$: weight ratio (%) of component (A-i)

The component (A), includes a propylene polymer mixture containing a polymer (A-1) having an intrinsic viscosity of over 0.7 dl/g and 1.1 dl/g or less and a polymer (A-2) having an intrinsic viscosity of over 1.1 dl/g and 10 dl/g or less wherein the intrinsic viscosity of the mixture is 1.05 dl/g or more.

The melting temperature of the component (A) is usually 100° C. or more. When the component (A) is a propylene homopolymer or a polymer derived from a heterophasic propylene polymerization material described later, the melting temperature of the component (A) is preferably 155° C. or more, more preferably 160° C. or more. When the component (A) is a propylene random copolymer, the melting temperature of the component (A) is preferably 130° C. or more, more preferably 135° C. or more. The melting temperature of the component (A) is usually 175° C. or less.

The melt flow rate of the component (A) measured by method B under conditions of a temperature of 230° C. and a load of 21.18 N according to a method prescribed in JIS K-7210 is preferably 10 g/10 min or more and 300 g/10 min or less, more preferably 20 g/10 min or more and 200 g/10 min or less, for obtaining better impact strength at low temperature of a molded body.

The content of the component (A) is 26% by weight or more and 59% by weight or less when the total amount of the component (A), the component (B), the component (C) and the component (D) contained in the thermoplastic elastomer composition is 100% by weight, and it is preferably 31% by weight or more and 53% by weight or less, more preferably 36% by weight or more and 49% by weight or less, from the standpoint of rigidity at high temperature of a molded body.

<Component (B)>

The component (B)) is a copolymer having a monomer unit derived from ethylene and a monomer unit derived from at least one selected from the group consisting of propylene and α-olefins having a number of carbon atoms of 4 or more and 12 or less in which the content of a monomer unit derived from ethylene is 15% or more and less than 60% when the total amount of a monomer unit derived from ethylene and a monomer unit derived from at least one selected from the group consisting of propylene and α-olefins having a number of carbon atoms of 4 or more and 12 or less contained in the copolymer is 100%, and the intrinsic viscosity ([RB]) is 5.5 dl/g or more.

The component (B) may contain two or more kinds of monomer units derived from at least one selected from the group consisting of propylene and α-olefins having a number of carbon atoms of 4 or more and 12 or less.

The α-olefin having a number of carbon atoms of 4 or more and 12 or less includes 1-butene, 2-methylpropylene, 1-pentene, 3-methyl-1-butene, 1-hexene, 4-methyl-1-pentene, and 1-octene. The α-olefin having a number of carbon atoms of 4 or more and 12 or less is preferably 1-hexene or 1-octene.

The component (B) includes an ethylene-propylene copolymer, an ethylene-1-butene copolymer, an ethylene-propylene-1-butene copolymer, an ethylene-1-hexene copolymer, an ethylene-1-octene copolymer, an ethylene-1-hexene-1-octene copolymer, an ethylene-propylene-1-butene copolymer, an ethylene-propylene-1-hexene copolymer, an ethylene-propylene-1-octene copolymer, and an ethylene-1-butene-1-octene copolymer, and an ethylene-propylene copolymer is preferable. The component (B) may be a random copolymer or may be a block copolymer. The block copolymer as the component (B) includes an olefin-based block copolymer containing a polymerization block comprising ethylene and an ethylene-α-olefin copolymerization block.

In the component (B), the number of a monomer unit derived from ethylene is 15% or more and less than 60%, preferably 22% or more and less than 58%, more preferably 36% or more and less than 53% when the total number of all monomer units contained in the copolymer is 100%.

The number of a monomer unit derived from ethylene in the component (B) can be determined by a method prescribed in ASTM D 3900.

The component (B) may also contain a monomer unit derived from a non-conjugated diene. The non-conjugated diene includes chain non-conjugated dienes such as 1,4-hexadiene, 1,6-octadiene, 2-methyl-1,5-hexadiene, 6-methyl-1,5-heptadiene, and 7-methyl-1,6-octadiene; cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene; trienes such as 2,3-diisopropylidene-5-norbornene, 2-ethylidene-3-isopropylidene-5-norbornene, 2-propenyl-2,2-norbornadiene, 1,3,7-octatriene, and 1,4,9-decatriene, and preferable is 5-ethylidene-2-norbornene, 5-vinylnorbornene or dicyclopentadiene. The component (B) may have two or more kinds of the monomer units derived from a non-conjugated diene.

When the component (B) contains a monomer unit derived from a non-conjugated diene, the iodine value of the component (B) is 0.1 or more and 20 or less, and it is preferably 0.1 or more and 15 or less, more preferably 0.1 or more and 5 or less, from the standpoint of rigidity of a molded body.

In the present specification, "iodine value" denotes a number (unit: none) represented in terms of "g" of the mass of iodine reacting with 100 g of a copolymer comprising a monomer unit derived from a non-conjugated diene. The iodine value of a copolymer comprising a monomer unit derived from a non-conjugated diene is determined by infrared spectroscopy.

The component (B) can be obtained by copolymerizing ethylene and at least one selected from the group consisting of propylene and α-olefins having a number of carbon atoms of 4 or more and 12 or less, in the presence of a catalyst for olefin polymerization. The catalyst for olefin polymerization includes complex type catalysts such as a Ziegler-Natta type catalyst, a metallocene type catalyst, and a non-metallocene type catalyst. The polymerization method includes a slurry polymerization method, a solution polymerization method, a bulk polymerization method, and a gas phase polymerization method.

The intrinsic viscosity ([rB]) of the component (B) is preferably 5.5 dl/g or more and 12.0 dl/g or less, more preferably 5.8 dl/g or more and 10.0 dl/g or less, from the standpoint of welding strength to a molded body comprising a propylene-based polymer.

The thermoplastic elastomer composition according to the present invention may contain only one kind of the component (B) or may contain two or more kinds of the component (B). When the thermoplastic elastomer composition contains two or more kinds of the component (B) and [nB] obtained by substituting the intrinsic viscosity of each component (B) into the formula (2) is 5.5 dl/g or more, a mixture of the two or more kinds of the component (B) is "component (B)".

$$[\eta B] = \Sigma([\eta_{Bi}] \times m_{Bi})/\Sigma[m_{Bi}] \qquad (2)$$

Component (B-i): a copolymer comprising a monomer unit derived from ethylene in which the number of the monomer unit derived from ethylene is 15% or more and less than 60%

$[\eta_{Bi}]$: intrinsic viscosity (dl/g) of component (B-i)

$m_{Bi}$: weight ratio (%) of component (B-i)

The content of the component (B) is 2% by weight or more and 9% by weight or less when the total amount of the component (A), the component (B), the component (C) and the component (D) contained in the thermoplastic elastomer composition is 100% by weight, and it is preferably 4% by weight or more and 8% by weight or less, more preferably 5% by weight or more and 8% by weight or less, from the standpoint of rigidity at high temperature of a molded body.

The component (A) and the component (B) contained in the thermoplastic elastomer composition may be a polymer derived from a heterophasic propylene polymerization material comprising the component (A) and the component (B).

In the present specification, "heterophasic propylene polymerization material" denotes a mixture having a structure in which an ethylene-based copolymer is dispersed in a matrix of a propylene-based polymer.

The content of the component (A) contained in a heterophasic propylene polymerization material comprising the component (A) and the component (B) is preferably 60% by weight or more and 95% by weight or less, and the content of the component (B) is preferably 5% by weight or more and 40% by weight or less when the total amount of the heterophasic propylene polymerization material is 100% by weight. From the standpoint of impact strength at low temperature of a molded body, the content of the component (A) is preferably 75% by weight or more and 90% by weight or less, and the content of the component (B) is preferably 10% by weight or more and 25% by weight or less when the total amount of the heterophasic propylene polymerization material is 100% by weight. The component (A) of the heterophasic propylene polymerization material may be contained only singly or two or more kinds of the components (A) may be contained. The component (B) of the heterophasic propylene polymerization material may be contained only singly or two or more kinds of the components (B) may be contained.

The heterophasic propylene polymerization material can be produced by multi-stage polymerization in the presence of a polymerization catalyst. In a first polymerization step, a monomer containing propylene is polymerized in the presence of a polymerization catalyst to produce a component (A), and in a second polymerization step, at least one monomer selected from the group consisting of propylene and α-olefins having a number of carbon atoms of 4 or more and 12 or less and ethylene are copolymerized in the presence of the component (A) obtained in the first polymerization step to produce a component (B), thereby the heterophasic propylene polymerization material can be produced.

The polymerization catalyst used for producing a propylene polymerization material includes a Ziegler type catalyst system, a Ziegler-Natta type catalyst system, a catalyst system comprising a compound of a transition metal belonging to group 4 of the periodic table having a cyclopentadienyl ring and an alkylaluminoxane, a catalyst system comprising a compound of a transition metal belonging to group 4 of the periodic table having a cyclopentadienyl group, a compound reacting with the transition metal compound to form an ionic complex and an organoaluminum compound.

A pre-polymerization catalyst may be used in the presence of the polymerization catalyst. The pre-polymerization catalyst includes catalyst systems described in JP-A No. Sho-61-218606, JP-A No. Sho-61-287904, JP-A No. Hei-5-194685, JP-A No. Hei-7-216017, JP-A No. Hei-9-316147, JP-A No. Hei-10-212319 and JP-A No. 2004-182981.

The polymerization process for producing the propylene polymerization material incudes bulk polymerization, solution polymerization, slurry polymerization and gas phase polymerization. The inactive hydrocarbon solvent used in solution polymerization and slurry polymerization includes propane, butane, isobutane, pentane, hexane, heptane and octane. Two or more of these polymerization processes may be combined, and the polymerization process may be any of batch mode or continuous mode. As the polymerization process for producing the propylene polymerization material, continuous mode gas phase polymerization and bulk-gas phase polymerization performing bulk polymerization and gas phase polymerization continuously are preferable.

In the heterophasic propylene polymerization material, the [$\eta$A] may be the following [$\eta$cxis], and the [$\eta$B] may be the following [$\eta$cxs]. The intrinsic viscosity ([$\eta$cxs]) of the 20° C. xylene-soluble portion (CXS portion) is preferably 5.5 dl/g or more and 12.0 dl/g or less, more preferably 5.8 dl/g or more and 10.0 dl/g or less, from the standpoint of welding strength to a molded body comprising propylene-based polymer. The ratio of [$\eta$cxs] to the intrinsic viscosity ([$\eta$cxis]) of the 20° C. xylene-insoluble portion (CXIS portion) is preferably 1.8 or more and 9 or less.

The CXS portion and the CXIS portion are obtained by the following method. About 5 g of a propylene polymerization material is dissolved completely in 500 ml of boiling xylene, then, the resultant xylene solution is gradually cooled down to room temperature, and kept at 20° C. for 4 hours or more, and the precipitate and the solution are obtained by filtration. The resultant precipitate is the CXIS portion. The product obtained by removing the solvent from the resultant solution is the CXS portion.

The melt flow rate of a heterophasic propylene polymerization material measured by method B under conditions of a temperature of 230° C. and a load of 21.18 N according to a method prescribed in JIS K-7210 is preferably 10 g/10 min or more and 200 g/10 min or less, more preferably 15 g/10 min or more and 100 g/10 min or less, from the standpoint of impact strength at low temperature of a molded body.

The total content of the component (A) and the component (B) in a thermoplastic elastomer composition is 30% by weight or more and 68% by weight or less, preferably 41% by weight or more and 61% by weight or less, more preferably 46% by weight or more and 54% by weight or less when the sum of the contents of the component (A), the component (B), the component (C) and the component (D) is 100% by weight, from the standpoint of rigidity at high temperature and impact strength at low temperature of a molded body and welding strength to a molded body comprising a propylene-based polymer.

<Component (C)>

The component (C) is a copolymer having a monomer unit derived from ethylene and a monomer unit derived from at least one selected from the group consisting of $\alpha$-olefins having a number of carbon atoms of 5 or more and 12 or less in which the number of a monomer unit derived from ethylene is 83% or more and less than 93% when the total number of all monomer units contained in the copolymer is 100%.

The component (C) may have two or more kinds of monomer units derived from at least one selected from the group consisting of $\alpha$-olefins having a number of carbon atoms of 5 or more and 12 or less. The thermoplastic elastomer composition according to the present invention may contain only one kind of the component (C) or may contain two or more kinds of the components (C).

The $\alpha$-olefin having a number of carbon atoms of 5 or more and 12 or less in the component (C) includes 1-pentene, 3-methyl-1-butene, 1-hexene, 4-methyl-1-pentene, and 1-octene. The $\alpha$-olefin having a number of carbon atoms of 5 or more and 12 or less is more preferably 1-hexene or 1-octene.

The component (C) includes an ethylene-1-hexene copolymer, an ethylene-1-octene copolymer, and an ethylene-1-hexene-1-octene copolymer. The component (C) may be a random copolymer or may be a block copolymer. The block copolymer as the component (C) includes an olefin-based block copolymer containing a polymerization block comprising ethylene and an ethylene-$\alpha$-olefin copolymerization block.

The number of a monomer unit derived from ethylene in the component (C) is 83% or more and less than 93%, preferably 86% or more and less than 92% when the total number of all monomer units contained in the copolymer is 100%.

The number of a monomer unit derived from ethylene in the component (C) can be determined by $^{13}$C-nuclear magnetic resonance spectroscopy.

The component (C) may contain a monomer unit derived from a non-conjugated diene. The non-conjugated diene in the monomer unit derived from a non-conjugated diene includes non-conjugated dienes listed as the non-conjugated diene in the component (B).

When the component (C) contains a monomer unit derived from a non-conjugated diene, the iodine value of the component (C) is 0.1 or more and 20 or less, and it is preferably 0.1 or more and 15 or less, more preferably 0.1 or more and 5 or less, from the standpoint of rigidity of a molded body.

The component (C) can be obtained by copolymerizing ethylene and at least one selected from the group consisting of $\alpha$-olefins having a number of carbon atoms of 5 or more and 12 or less in the presence of a catalyst for olefin polymerization. The catalyst for olefin polymerization includes complex type catalysts such as a Ziegler-Natta type catalyst, a metallocene type complex, and a non-metallocene type complex. The polymerization method includes a slurry polymerization method, a solution polymerization method, a bulk polymerization method, and a gas phase polymerization method.

The intrinsic viscosity ([nC]) of the component (C) is preferably 0.5 dl/g or more and less than 5.5 dl/g, more preferably 0.7 dl/g or more and 3.5 dl/g or less, further preferably 0.8 dl/g or more and 2.5 dl/g or less, from the standpoint of welding strength to a molded body comprising a propylene-based polymer. When the thermoplastic elastomer composition contains two or more kinds of component (C), [$\eta$C] determined by substituting the intrinsic viscosity of each component (C) into the formula (3) is the intrinsic viscosity of the component (C).

$$[\eta C]=\Sigma([\eta_{Ci}]\times m_{Ci})/\Sigma[m_{Ci}] \quad (3)$$

Component (C-i): an copolymer comprising a monomer unit derived from ethylene in which the content of the monomer unit derived from ethylene is 83% or more and less than 93%

[$\eta$ci]: intrinsic viscosity (dl/g) of component (C-i)

$m_{Ci}$: weight ratio (%) of component (C-i)

The melting temperature of the component (C) is preferably 50° C. or more and 130° C. or less, more preferably 53° C. or more and 120° C. or less, more preferably 55° C. or more and 90° C. or less.

The density of the component (C) is preferably 0.865 g/cm³ or more and less than 0.875 g/cm³, more preferably 0.868 g/cm³ or more and 0.872 g/cm³ or less, from the standpoint of further improvement of impact strength at low temperature of a molded body comprising a thermoplastic elastomer composition and from the standpoint of welding strength to a molded body comprising a propylene-based polymer.

In the present specification, the density is measured according to a method prescribed in JIS K7112 without annealing.

The melt flow rate of the component (C) measured by method B under conditions of a temperature of 190° C. and a load of 21.18 N according to a method prescribed in JIS K-7210 is preferably 0.01 g/10 min or more and 2 g/10 min or less, more preferably 0.05 g/10 min or more and 1.5 g/10 min or less, further preferably 0.1 g/10 min or more and 1.2 g/10 min or less, from the standpoint of welding strength to a molded body comprising a propylene-based polymer.

The content of the component (C) is 16% by weight or more and 61% by weight or less when the total amount of the component (A), the component (B), the component (C) and the component (D) contained in the thermoplastic elastomer composition is 100% by weight, and it is preferably 24% by weight or more and 39% by weight or less, more preferably 27% by weight or more and 36% by weight or less, from the standpoint of rigidity at high temperature of a molded body and welding strength to a molded body comprising a propylene-based polymer.

<Component (D)>

The component (D) is a copolymer having a monomer unit derived from ethylene in which the number of a monomer unit derived from ethylene is 60% or more and less than 83% when the total number of all monomer units contained in the copolymer is 100% and a monomer unit derived from at least one selected from the group consisting of propylene and α-olefins having a number of carbon atoms of 4 or more and 12 or less.

The component (D) may have two or more kinds of monomer units derived from at least one selected from the group consisting of propylene and α-olefins having a number of carbon atoms of 4 or more and 12 or less. The thermoplastic elastomer composition according to the present invention may contain only one kind of the component (D) or may contain two or more kinds of the components (D).

The α-olefin having a number of carbon atoms of 4 or more and 12 or less in the component (D) includes 1-butene, 2-methylpropene, 1-pentene, 3-methyl-1-butene, 1-hexene, 4-methyl-1-pentene, and 1-octene. The α-olefin having a number of carbon atoms of 4 or more and 12 or less is more preferably 1-butene.

The component (D) includes an ethylene-propylene copolymer, an ethylene-1-butene copolymer, an ethylene-propylene-1-butene copolymer, an ethylene-1-hexene copolymer, an ethylene-1-octene copolymer, an ethylene-1-hexene-1-octene copolymer, an ethylene-propylene-1-hexene copolymer, an ethylene-propylene-1-octene copolymer, and an ethylene-1-butene-1-octene copolymer. The component (D) may be a random copolymer or may be a block copolymer. The block copolymer as the component (D) includes an olefin-based block copolymer containing a polymer block comprising ethylene and an ethylene-α-olefin copolymerization block.

The number of a monomer unit derived from ethylene in the component (D) is 60% or more and less than 83%, preferably 71% or more and less than 80% when the total number of all monomer units contained in the copolymer is 100%.

The number of a monomer unit derived from ethylene in the component (D) can be determined by $^{13}C$-nuclear magnetic resonance spectroscopy.

The component (D) may contain a monomer unit derived from a non-conjugated diene. The non-conjugated diene in the monomer unit derived from a non-conjugated diene in the component (D) includes non-conjugated dienes listed as the non-conjugated diene in the component (B).

When the component (D) contains a monomer unit derived from a non-conjugated diene, the iodine value of the component (D) is 0.1 or more and 20 or less, and it is preferably 0.1 or more and 15 or less, more preferably 0.1 or more and 10 or less, from the standpoint of rigidity of a molded body.

The component (D) can be obtained by copolymerizing ethylene and at least one selected from the group consisting of α-olefins having a number of carbon atoms of 5 or more and 12 or less in the presence of a catalyst for olefin polymerization. The catalyst for olefin polymerization includes complex type catalysts such as a Ziegler-Natta type catalyst, a metallocene type complex, and a non-metallocene type complex. The polymerization method includes a slurry polymerization method, a solution polymerization method, a bulk polymerization method, and a gas phase polymerization method.

The intrinsic viscosity ([ηD]) of the component (D) is preferably 0.5 dl/g or more and less than 5.5 dl/g, more preferably 0.7 dl/g or more and 3.5 dl/g or less, further preferably 0.8 dl/g or more and 3.0 dl/g or less, from the standpoint of impact strength at low temperature of a molded body. When the thermoplastic elastomer composition contains two or more kinds of the component (D), [ηD] determined by substituting the intrinsic viscosity of each component (D) into the formula (4) is the intrinsic viscosity of the component (D).

$$[\eta D]=\Sigma([\eta_{Di}] \times m_{Di})/\Sigma[m_{Di}] \quad (4)$$

Component (D-i): a copolymer comprising a monomer unit derived from ethylene in which the content of the monomer unit derived from ethylene is 60% or more and less than 83%

$[\eta_{Di}]$: intrinsic viscosity (dl/g) of component (D-i)

$m_{Di}$: weight ratio (%) of component (D-i)

The melting temperature of the component (D) is preferably less than 50° C., and it is more preferably less than 48° C., further preferably less than 40° C., from the standpoint of impact strength at low temperature of a molded body.

The density of the component (D) is preferably 0.850 g/cm³ or more and less than 0.865 g/cm³, more preferably 0.852 g/cm³ or more and 0.862 g/cm³ or less, from the standpoint of impact strength at low temperature of a molded body comprising a thermoplastic elastomer composition and welding strength to a molded body comprising a propylene-based polymer.

The melt flow rate of the component (D) measured by method B under conditions of a temperature of 190° C. and a load of 21.18 N according to a method prescribed in JIS K-7210 is preferably 0.01 g/10 min or more and 0.7 g/10 min or less, more preferably 0.05 g/10 min or more and 0.5 g/10 min or less, further preferably 0.1 g/10 min or more and 0.3 g/10 min or less, from the standpoint of welding strength to a molded body comprising a propylene-based polymer.

The content of the component (D) is 11% by weight or more and 56% by weight or less when the total amount of the component (A), the component (B), the component (C) and the component (D) contained in the thermoplastic elastomer composition is 100% by weight, and it is preferably 14% by weight or more and 40% by weight or less, more preferably 17% by weight or more and 25% by weight or less, from the standpoint of rigidity at high temperature and welding strength to a molded body comprising a propylene-based polymer.

The ratio of the content of the component (C) to the content of the component (D) (component (C) (% by weight)/component (D) (% by weight)) is over 1 and 5 or less, and it is preferably 1.1 or more and 3.4 or less, more preferably 1.2 or more and 1.9 or less, from the standpoint of impact strength at low temperature of a molded body and welding strength to a molded body comprising a propylene-based polymer.

The total amount of the component (A), the component (B), the component (C) and the component (D) is preferably 86% or more when the total amount of the thermoplastic elastomer composition of the present invention is 100% by weight.

<Other Component>

The thermoplastic elastomer composition of the present invention may further contain a fatty acid having a number of carbon atoms of 5 or more, a metal salt of a fatty acid having a number of carbon atoms of 5 or more, an amide compound of a fatty acid having a number of carbon atoms of 5 or more or an ester compound of a fatty acid having a number of carbon atoms of 5 or more, and these compounds may be contained each singly or two or more kinds of the compounds may be contained.

The fatty acid having a number of carbon atoms of 5 or more includes lauric acid, palmitic acid, stearic acid, behenic acid, oleic acid, erucic acid, linoleic acid, and ricinoleic acid.

The metal salt of a fatty acid having a number of carbon atoms of 5 or more is a metal salt of the fatty acid having a number of carbon atoms of 5 or more. The metal includes Li, Na, Mg, Al, K, Ca, Zn, Ba, and Pb. The metal salt of a fatty acid having a number of carbon atoms of 5 or more includes lithium stearate, sodium stearate, calcium stearate, and zinc stearate.

The amide compound of a fatty acid having a number of carbon atoms of 5 or more includes lauric amide, palmitic amide, stearic amide, oleic amide, erucamide, methylenebisstearic amide, ethylenebisstearic amide, ethylenebisoleic amide, and stearyldiethanolamide, and erucamide is preferable.

The ester compound of a fatty acid having a number of carbon atoms of 5 or more includes esters comprising an alcohol and the fatty acid having a number of carbon atoms of 5 or more.

The alcohol includes aliphatic alcohols such as myristyl alcohol, palmityl alcohol, stearyl alcohol, behenyl alcohol, and 12-hydroxy stearyl alcohol; aromatic alcohols such as benzyl alcohol, β-phenylethyl alcohol, and phthalyl alcohol; polyhydric alcohols such as glycerin, diglycerin, polyglycerin, sorbitan, sorbitol, propylene glycol, polypropylene glycol, polyethylene glycol, pentaerythritol, and trimethylolpropane.

The ester of a fatty acid having a number of carbon atoms of 5 or more includes glycerin monooleate, glycerin dioleate, polyethylene glycol monostearate, and citric acid distearate.

The contents of the fatty acid having a number of carbon atoms of 5 or more, the metal salt of a fatty acid having a number of carbon atoms of 5 or more, the amide compound of a fatty acid having a number of carbon atoms of 5 or more or the ester compound of a fatty acid having a number of carbon atoms of 5 or more are each preferably 0.01 parts by weight or more and 1.5 parts by weight or less, more preferably 0.05 parts by weight or more and 1.0 parts by weight or less when the sum of the contents of the component (A), the component (B), the component (C) and the component (D) is 100 parts by weight.

The thermoplastic elastomer composition according to the present invention may appropriately contain resins other than the component (A), the component (B), the component (C) and the component (D); inorganic fillers such as talc, calcium carbonate, fired kaolin, glass fiber, hollow glass sphere, silica, metal soap, titanium dioxide, mica, and potassium titanate fiber; organic fillers such asfiber, wood flour, cellulose powder, carbon fiber, and carbon black; lubricants such as silicone oil, and silicone rubber; antioxidants such as phenol type, sulfur-based, phosphorus-based, lactone type, and vitamin-based; weather-resistant stabilizers; ultraviolet absorbers such as benzotriazole type, triazine type, anilide type, and benzophenone type; heat stabilizers; light stabilizers such as hindered amine type, and benzoate type; pigments; nucleating agents; adsorbents which are metal oxides such as zinc oxide, and magnesium oxide, metal chlorides such as iron chloride, and calcium chloride, hydrotalcite, and aluminate; softeners; cross-linking agents such as organic peroxide; and cross-linking aids such as trimethylolpropane trimethacrylate, N,N-m-phenylene bismaleimide, and divinylbenzene.

The resin other than the component (A), the component (B), the component (C) and the component (D) includes olefin-based resins excluding those corresponding to the component (A), the component (B), the component (C) or the component (D); olefin-based elastomers excluding those corresponding to the component (A), the component (B), the component (C) or the component (D); styrene-based elastomers, polyphenylene ether-based resins, polyamide-based resins, polyester-based resins, polyoxymethylene-based resins, and polymethyl methacrylate-based resins.

The olefin-based elastomer includes copolymers comprising a monomer unit derived from ethylene and a monomer unit derived from at least one selected from the group consisting of propylene and α-olefins having a number of carbon atoms of 4 or more and 12 or less.

The copolymer comprising a monomer unit derived from ethylene and a monomer unit derived from at least one selected from the group consisting of propylene and α-olefins having a number of carbon atoms of 4 or more and 12 or less includes a propylene-ethylene copolymer, an ethylene-1-butene copolymer, a propylene-ethylene-1-butene copolymer, an ethylene-1-hexene copolymer, an ethylene-1-octene copolymer, an ethylene-1-hexene-1-octene copolymer, a propylene-ethylene-1-hexene copolymer, a propylene-ethylene-1-octene copolymer, and an ethylene-1-butene-1-octene copolymer, and preferable are a propylene-ethylene copolymer or an ethylene-1-octene copolymer, a propylene-ethylene-1-butene copolymer, a propylene-ethylene-1-hexene copolymer, a propylene-ethylene-1-octene copolymer and an ethylene-1-butene-1-octene copolymer. The copolymer comprising a monomer unit derived from ethylene and a monomer unit derived from at least one selected from the group consisting of propylene and α-olefins having a number of carbon atoms of 4 or more and 12 or less may be a random copolymer or may be a block copolymer. The block copolymer includes an olefin-based block copolymer containing a polymerization block comprising ethylene and an ethylene-α-olefin copolymerization block.

The styrene-based elastomer includes a hydrogenated product of a styrene-butadiene block copolymer (styrene-(ethylene/butylene)-styrene copolymer).

The softener includes mineral oils such as paraffinic mineral oils, naphthenic mineral oils and aromatic mineral oils, and paraffinic mineral oils are preferable. The softener may be added in melt-kneading the component (A), the component (B), the component (C) and the component (D), alternatively, the softener may be previously mixed with any component before melt kneading. The process for mixing an ethylene-based copolymer and the softener include a process for mixing an ethylene-based copolymer in the form of solid with the softener with a mixing machine, and a process for mixing a solution of an ethylene-based copolymer with the softener to obtain a mixture, then, removing a solvent in the mixture.

The content of the softener is preferably 0.1% by weight or more and 15% by weight or less when the total amount of the thermoplastic elastomer composition is 100% by weight.

In the present specification, "mineral oil" denotes a substance which is liquid or grease at normal temperature and which comprises at least one compound selected from the group consisting of aromatic compounds, naphthene ring compounds and paraffinic compounds obtained from petroleum-derived hydrocarbon compounds.

The thermoplastic elastomer composition may be produced by simultaneously melt-kneading all components contained in the composition, or a process for producing the thermoplastic elastomer composition may comprise a step of melt-kneading a part of components of the thermoplastic elastomer composition to obtain a composition (A) and a step of adding residual components of the thermoplastic elastomer composition to the composition (A) and melt-kneading them. Melt keading may be conducted in two or more divided processes.

The process for producing the thermoplastic elastomer composition includes a process for the thermoplastic elastomer composition comprising a step of melt-kneading the component (A), the component (B), the component (C) and the component (D).

Components other than the component (A), the component (B), the component (C) and the component (D) may be added in the step of melt-kneading.

The melt kneading apparatus used for the melt kneading includes a mixing roll as an open apparatus, and a Bunbury mixer, an extruder, a kneader and a continuous mixer as a closed apparatus. In the present invention, a closed apparatus is preferably used. The temperature in melt kneading is usually 150° C. or more and 250° C. or less, and the melt kneading time is usually 10 seconds or more and 30 minutes or less.

The molded body comprising the thermoplastic elastomer composition includes automobile interior parts, automobile exterior parts, electric parts, home electronics parts, furniture parts, footwear members, and architectural members. The automobile interior parts include an airbag cover, an instrumental panel, and a pillar, and the automobile exterior parts include a side molding.

The molding method of a molded body comprising the thermoplastic elastomer composition is preferably an injection molding method. When the thermoplastic elastomer composition is injection-molded, the molding temperature in injection molding is usually 150° C. or more and 300° C. or less, preferably 180° C. or more and 280° C. or less, more preferably 200° C. or more and 250° C. or less. The temperature of a metal mold used in injection molding is usually 0° C. or more and 100° C. or less, preferably 20° C. or more and 90° C. or less, more preferably 40° C. or more and 80° C. or less, further preferably 50° C. or more and 75° C. or less.

[Physical Property of Thermoplastic Elastomer Composition and Molded Body]

It is preferable for the thermoplastic elastomer composition that the bending elastic modulus measured at a temperature of 90° C. according to a method prescribed in JIS K7203 of a molded body obtained by molding the thermoplastic elastomer composition by the following method is 100 MPa or more and 140 MPa or less.

Molding method of molded body: a thermoplastic elastomer composition is injection-molded by an injection molding machine equipped with a side gate flat sheet metal mold (length 90 mm, width 150 mm, thickness 2 mm) under conditions of a cylinder temperature of 220° C. and a mold temperature of 50° C., to obtain an injection-molded body having a length of 90 mm, a width of 150 mm and a thickness of 2 mm.

The bending elastic modulus measured at a temperature of 90° C. according to a method prescribed in JIS K7203 of the molded body comprising the thermoplastic elastomer composition is preferably 100 MPa or more and 140 MPa or less.

Izod impact strength of the molded body at −45° C. is measured according to JIS K7110. The evaluation of Izod impact strength of the molded body is preferably no break.

A first molded body comprising a propylene-based polymer and a second molded body comprising the thermoplastic elastomer composition according to the present invention can be welded with each other, to obtain a composite molded body.

As the method for welding, a vibration welding method is mentioned.

The propylene-based polymer constituting the first molded body includes a propylene homopolymer, a propylene random copolymer and a heterophasic propylene polymerization material.

The propylene random copolymer includes (1) a propylene-ethylene random copolymer in which the number of a monomer unit derived from propylene is over 85% and 99.2% or less and the number of a monomer unit derived from ethylene is 0.8% or more and less than 15% when the total number of a monomer unit derived from propylene and a monomer unit derived from ethylene is 100%;

(2) a propylene-ethylene-α-olefin random copolymer in which the number of a monomer unit derived from propylene is over 85% and 98.5% or less, the number of a monomer unit derived from ethylene is 0.15% or more and less than 15% and the number of a monomer unit derived from an α-olefin having a number of carbon atoms of 4 or more and 12 or less is 0.03% or more and less than 15% when the total number of a monomer unit derived from propylene, a monomer unit derived from ethylene and a monomer unit derived from an α-olefin having a number of carbon atoms of 4 or more and 12 or less is 100%; or (3) a propylene-α-olefin random copolymer in which the number of a monomer unit derived from propylene is 92.5% or more and 99.8% or less and the number of a monomer unit derived from an α-olefin having a number of carbon atoms of 4 or more and 12 or less is 0.2% or more and 7.5% or less when the total number of a monomer unit derived from propylene and a monomer unit derived from an α-olefin having a number of carbon atoms of 4 or more and 12 or less is 100%.

The heterophasic propylene polymerization material includes a heterophasic propylene polymerization material comprising a propylene-based polymer and an ethylene-based copolymer. The content of the ethylene-based copolymer contained in the heterophasic propylene polymerization material is preferably 10% by weight or more and 40% by weight or less when the total amount of the heterophasic propylene polymerization material is 100% by weight.

The melt flow rate of a propylene-based polymer constituting the first molded body (i) measured by method B under conditions of a temperature of 230° C. and a load of 21.18 N according to a method prescribed in JIS K-7210 is preferably 25 g/10 min or more and 100 g/10 min or less.

In the composite molded body, welding strength between the first molded body comprising a propylene-based polymer and the second molded body comprisingthe thermoplastic elastomer composition is preferably 7.8 MPa or more, more preferably 8.0 MPa or more.

In a composite molded body in which the first molded body comprising a propylene-based polymer and the second molded body comprising the thermoplastic elastomer composition are welded with each other, when the cross-sectional surface perpendicular to the welding surface is stained with a vapor of ruthenium tetraoxide, the stained domain preferably satisfies the requirement (1), and further, more preferably satisfies the requirement (2).

Requirement (1): when the stained cross-sectional surface is observed with a transmission electron microscope, D7 is 115 nm or less, wherein D7 is the number-average circle-equivalent diameter of the stained domain in a square having a side of 4 μm around a point where the distance from the welded part is 7 μm in a vertical direction, wherein the square presents in the second molded body.

Requirement (2): when the stained cross-sectional surface is observed with a transmission electron microscope, D200/D7 is 3.5 or more, wherein D200 is the number-average circle-equivalent diameter of the stained domain in a square having a side of 4 μm around a point where the distance from the welded part is 200 μm in a vertical direction, wherein the square present in the second molded body. When the cross-sectional surface perpendicular to the welding surface is stained with a vapor of ruthenium tetraoxide, the stained domain is supposed to be a domain comprising an ethylene-based copolymer. In a composite molded body in which the stained domain satisfies the requirement (1), welding strength between the first molded body and the second molded body is guessed to be high.

D7 and D200/D7 can be controlled by adjusting the [ηB] and the ratio of the content of the component (C) to the content of the component (D).

EXAMPLES

[Measurement of Physical Property]
1. Intrinsic viscosity ([ηA], [ηB], [ηC], [ηD], [ηcxs], [ηcxis], unit: dl/g)

The reduced viscosity of each components was measured using a Ubbelohde type viscometer in tetralin at 135° C., and each intrinsic viscosity thereof was determined by an extrapolation method according to a calculation method described in "Polymer Solution, Polymer Experiment (Kobunshi Jikkengaku) 11" (published by Kyoritsu Shuppan Co., Ltd., 1982) p. 491.

For the heterophasic propylene polymerization material in the present examples, the intrinsic viscosity ([rcxis]) of the 20° C. xylene-insoluble portion is regarded as the intrinsic viscosity ([HA]) of the propylene homopolymer component contained in the heterophasic propylene polymerization material, and the intrinsic viscosity ([ncxs]) of the 20° C. xylene-soluble portion is regarded as the intrinsic viscosity ([RB]) of the ethylene-propylene copolymer component contained in the heterophasic propylene polymerization material.

2. Melting Temperature (Unit: ° C.)

The peak temperature which is the peak temperature of the highest endotherm peak among endothermic peaks in the melting curve measured by the following differential scanning calorimetry is the melting temperature.

<Condition of Differential Scanning Calorimetry>

Using a differential scanning calorimeter, an aluminum pan having about 5 mg of an enclosed sample is (1) kept at 220° C. for 5 minutes, then, (2) cooled from 220° C. to −90° C. at a rate of 5° C./min, then, (3) heated from −90° C. to 200° C. at a rate of 5° C./min, under a nitrogen atmosphere. The differential scanning calorimetry curve obtained by calorimetry in step (3) is the melting curve.

3. Density (Unit: g/Cm$^3$)

The density was measured according to a method prescribed in JIS K7112 without annealing.

4. Melt Flow Rate (Unit: g/10 Min)

The melt flow raw was measured by method B under conditions of a temperature of 230° C. or 190° C. and a load of 21.18 N according to a method prescribed in JIS K-7210. Hereinafter, the melt flow rate measured by method B under conditions of a temperature of 230° C. and a load of 21.18 N is written as "MFR (230° C.)". The melt flow rate measured by method B under conditions of a temperature of 190° C. and a load of 21.18 N is written as "MFR (190° C.)".

5. Number of monomer unit derived from ethylene and number of monomer unit derived from at least one selected from the group consisting of propylene and α-olefins having a number of carbon atoms of 4 or more contained in component (A) or component (B)

The number of a monomer unit derived from ethylene and the number of a monomer unit derived from at least one selected from the group consisting of propylene and α-olefins having a number of carbon atoms of 4 or more contained in the component (A) or the component (B) were determined from infrared absorption spectrum measured with type FT-IR5200 manufactured by JASCO Corporation according to a method prescribed in ASTM D 3900.

6. Number of Monomer Unit Derived from Ethylene Contained in Component (C) or Component (D)

The number of a monomer unit derived from ethylene contained in the component (C) or the component (D) was determined by measuring the $^{13}$C-NMR spectrum by $^{13}$C-nuclear magnetic resonance spectroscopy under the following conditions (1) to (7) and using a method described in a literature (JMS-REV. MACROMOL. CHEM. PHYS., C29, 201-317 (1989)).

(1) instrument: AvancelIII HD600 manufactured by BRUKER (10 mm cryoprobe)
(2) measurement solvent: 1,1,2,2-tetrachloroethane-d2/1, 2-dichlorobenzene (volume ratio: 15/85)
(3) measurement temperature: 135° C.
(4) measuring method: proton decoupling method
(5) pulse width: 45 degree
(6) pulse repeating time: 4 seconds
(7) chemical shift value standard: tetramethylsilane 7. Iodine Value The component (D) was molded into a film with a thickness of about 0.5 mm by a hot press machine. By an infrared spectrophotometer, the intensities of the peak derived from dicyclopendadiene (absorption peak at 1611 cm-1) and the peak derived from 5-ethylidene-2-norbornene (absorption peak at 1688 cm$^{-1}$) of the film were measured. The molar content of a double bond was determined from the peak intensity, and the iodine value was calculated from the molar content.

8. Production Method of Injection Molded Body

Each thermoplastic elastomer composition of examples and comparative examples was injection-molded with an injection molding machine EC160NII manufactured by Toshiba Machine Co., Ltd. equipped with a side gate flat sheet metal mold having a length of 90 mm, a width of 150 mm, and a thickness of 2 mm under conditions of a cylinder temperature of 220° C. and a mold temperature of 50° C., to obtain an injection molded body having a length of 90 mm, a width of 150 mm and of thickness 2 mm. Under the same conditions, a propylene-based polymer (Nobrene BZE82G8 manufactured by Sumitomo Chemical Co., Ltd., melting temperature=165° C., MFR=36 g/10 min) was injection-molded, to obtain an injection molded body of the same shape.

9. Rigidity at High Temperature

According to a method prescribed in JIS K7203, bending elastic modulus of an injection molded body produced by "8. Production method of injection molded body" was measured under conditions of a bending rate of 1 mm/min and a measurement temperature of 90° C. using the shape of the test piece of JIS No. 3 dumbbell. The higher the bending elastic modulus is, the better the rigidity at high temperature is.

10. Impact Strength at Low Temperature (Izod Impact Strength)

According to a method prescribed in JIS K7110, Izod impact strength of an injection molded body produced by "8. Production method of injection molded body" was measured at a measurement temperature of −45° C.

The measurement results are described as shown below.
NB=no break
B=broken

11. Welding Strength

Figure 2:
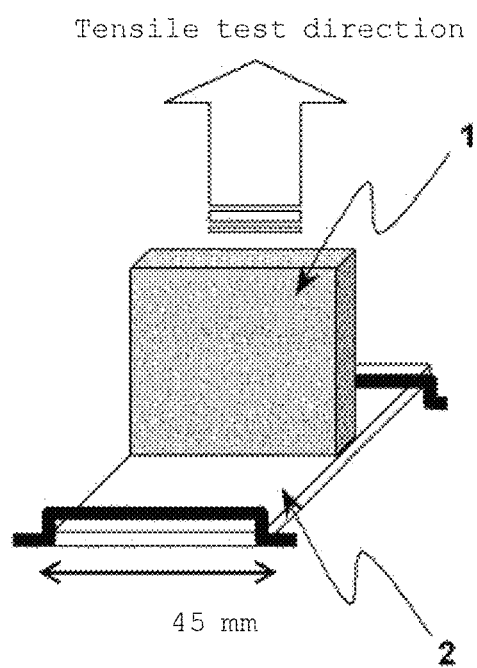
FIG. 2 is a schematic view of a composite molded body which is used for measurement of welding strength.

An injection molded body comprising a propylene-based polymer was the first molded body and an injection molded body comprising a thermoplastic elastomer composition was the second molded body. The injection molded bodies produced by "8. Production method of injection molded body" were cut respectively. The first molded body and the second molded body were located shown in FIG. 1. The injection direction of the first molded body was parallel to the injection direction of the second molded body. The second molded body was vibrated and welded to the first molded body under conditions of a pressure of 1 bar, a vibration amplitude of 1.5 mm, a welding depth of 0.4 mm and a retention time of 5 seconds by Vibration Welder (type: MICRO-PPL) manufactured by Branson, to obtain a composite molded body having the configuration shown in FIG. 1. A width of this composition molded body was 90 mm. This composite molded body was cut into a width of 45 mm, and the first molded body was fixed to the seat of a tensile tester (Autograph manufactured by Shimadzu Corp., type: AGS-500D) and the second molded body was attached to a load cell jig. A tensile test of the injection molded body was conducted under conditions of pulling second molded body part at a rate of 200 mm/min to the direction of an arrow shown in FIG. 2. The maximum tensile strength in the tensile test was adopted as the welding strength.

12. Measurement of Number-Average Circle-Equivalent Diameter

The composite molded body obtained in the 11. was epoxy-embedded. From the epoxy-embedded composite molded body, a cross-sectional surface perpendicular to the welding surface was cut out using a cryomicrotome, and stained with a vapor of ruthenium tetraoxide. From the stained cross-sectional surface, an ultrathin section having a thickness of about 0.1 μm was cut out using a diamond knife. The stained domain in a square having a side of 4 μm around a point where the shortest distance from the welded part the first molded body with the second molded body is 7 μm in a vertical direction, wherein the square presents in the second molded body of the cut-out ultrathin section, was observed with a transmission electron microscope (JEM-2100F transmission electron microscope manufactured by JEOL Ltd.) at a magnification of 10,000-fold. The transmission electron microscope-observed image was analyzed by image analysis using an image analysis software (A-zou kun manufactured by Asahi Kasei Engineering), and the number-average circle-equivalent diameter (D7) of all the stained domains present on the observed image was determined.

In a similar way, the stained domain in a square having a side of 4 μm around a point where the distance from the welded part is 200 μm in a vertical direction, wherein the square present in the second molded body of the cut-out ultrathin section was observed with a transmission electron microscope at a magnification of 10,000-fold. The transmission electron microscope-observed image was analyzed by image analysis, and the number-average circle-equivalent diameter (D200) of all the stained domains present on the observed image was determined.

13. Separation of CXIS Portion and CXS Portion

About 5 g of a sample was dissolved completely in 500 ml of boiling xylene, then, the resultant xylene solution was cooled down gradually to room temperature, and kept at 20° C. for 4 hours or more, and the precipitate and the solution were obtained by filtration. The precipitate was the CXIS portion, and the product obtained by removing the solvent from the solution was the CXS portion.

[Raw Material]

((A-1-1)+(B-1)) Nobrene WPX5343 manufactured by Sumitomo Chemical Co., Ltd. (heterophasic propylene polymerization material comprising propylene homopolymer component (A-1-1) and ethylene-propylene copolymer component (B-1))

(MFR (230° C.)=60 g/10 min; melting temperature=163° C.; [ηcxs]=6.0 dl/g; [ηcxis]=0.9 dl/g)

content of ethylene-propylene copolymer component (B-1)=13% by weight content of monomer derived from ethylene in ethylene-propylene copolymer component (B-1)=41%

((A-1-2)+(B-2)) Nobrene AX564E2 manufactured by Sumitomo Chemical Co., Ltd. (heterophasic propylene polymerization material comprising propylene homopolymer component (A-1-2) and ethylene-propylene copolymer component (B-2))

(MFR (230° C.)=55 g/10 min; melting temperature=164° C.; [ηcxs]=2.8 dl/g; [ηcxis]=1.1 dl/g)

content of ethylene-propylene copolymer component (B-2)=21% by weight content of monomer derived from ethylene in ethylene-propylene copolymer component (B-2)=47%

(A-2-1) Nobrene@ D101 manufactured by Sumitomo Chemical Co., Ltd.

(MFR (230° C.)=0.5 g/10 min; melting temperature=161° C.; [ηcxis]=3.0 dl/g)

content of ethylene monomer=0.4%;
(A-2-2) Nobrene® R101 manufactured by Sumitomo Chemical Co., Ltd.
(MFR (230° C.)=20 g/10 min; melting temperature=162° C.; [ηcxis]=1.3 dl/g)
content of ethylene monomer=0%;

(C-1) ethylene-1-octene copolymer

Engage® 8150 manufactured by The Dow Chemical Company
(MFR (190° C.)=0.5 g/10 min, number of monomer unit derived from ethylene=88%, melting temperature=55° C., [CC]=1.7 dl/g, density=0.868 g/cm³)

(C-2) ethylene-1-octene copolymer

Engage® 8100 Manufactured by the Dow Chemical Company
(MFR (190° C.)=1 g/10 min, number of monomer unit derived from ethylene=89%, melting temperature=60° C., [CC]=1.5 dl/g, density=0.870 g/cm³)

(D-1) ethylene-propylene-5-ethylidene-2-norbornene copolymer (MFR (190° C.)=0.2 g/10 min, number of monomer unit derived from ethylene=76%, iodine value=4, melting temperature=10° C., [ηD]=2.2 dl/g, density=0.859 g/cm³)

(D-2) ethylene-1-butene copolymer

Engage® HM 7487 manufactured by The Dow Chemical Company
(MFR (190° C.)=0.2 g/10 min, [RD]=1.9 dl/g, number of monomer unit derived from ethylene=80%, melting temperature=37° C., density=0.860 g/cm³)

(D-3) ethylene-1-butene copolymer

Engage® 7467 manufactured by The Dow Chemical Company
(MFR (190° C.)=1.2 g/10 min, [ηD]=1.5 dl/g, number of monomer unit derived from ethylene=82%, melting temperature=34° C., density=0.862 g/cm³)

Eerucamide (Neutron S manufactured by Nippon Fine Chemical Co., Ltd.)
Antioxidant 1: SUMILIZER® GA80 manufactured by Sumitomo Chemical Co., Ltd.
Antioxidant 2: IRGAFOS® 168 manufactured by BASF Japan Ltd.
Light stabilizer 1: SUMISORB® 300 manufactured by Sumitomo Chemical Co., Ltd.
Light stabilizer 2: TINUVIN® 622SF manufactured by BASF Japan Ltd.
Light stabilizer 3: TINUVIN® 123 manufactured by BASF Japan Ltd.
Preservative: hydrotalcite (DHT-4A manufactured by Kyowa Chemical Industry Co., Ltd.)
Inorganic filler: calcium carbonate (Vigot10 manufactured by Shiraishi Calcium Kaisha Ltd.)

Example 1

Forty five (45) % by weight of a heterophasic propylene polymerization material comprising (A-1-1) and (B-1), 5% by weight of the polymer (A-2-1), 30% by weight of the ethylene-1-octene copolymer (C-1) and 20% by weight of the ethylene-propylene-5-ethylidene-2-norbornene copolymer (D-1) when the sum of (A-1-1), (A-2-1), (B-1), (C-1) and (D-1) is 100% by weight,
and 0.05 parts by weight of erucamide, 0.2 parts by weight of an antioxidant 1, 0.1 part by weight of an antioxidant 2, 0.2 parts by weight of a light stabilizer 1, 0.1 part by weight of a light stabilizer 2, 0.1 part by weight of a light stabilizer 3, 0.2 parts by weight of a preservative and 0.6 parts by weight of an inorganic filler, with respect to 100 parts by weight of the total of the (A-1-1), (A-2-1), (B-1), (C-1) and (D-1), were melt-kneaded by a twin screw extruder at a cylinder temperature of 200° C., to obtain thermoplastic elastomer compositions. The resultant thermoplastic elastomer compositions were injection-molded by the method 9, to obtain injection molded bodies, and composite molded bodies were obtained by the method 12. The results of measurement of physical properties of the injection molded bodies and the composite molded bodies are shown in Table 1. The intrinsic viscosity of the propylene-based polymer was determined by substituting [ηcxis] of the heterophasic propylene polymerization material and the intrinsic viscosity of (A-2-1) into the formula (1).

Example 2 to 3 and Comparative Examples 1 to 5

Thermoplastic elastomer compositions were produced in the same manner as in Example 1 with components and contents shown in Table 1. The resultant thermoplastic elastomer compositions were injection-molded by the method 9, to obtain injection molded bodies, and composite molded bodies were obtained by the method 12. The results of measurement of physical properties of the injection molded bodies and the composite molded bodies are shown in Table 1.

TABLE 1

|  | Ex. 1 | Ex. 2 | Ex. 3 | Com. Ex. 1 | Com. Ex. 2 | Com. Ex. 3 | Com. Ex. 4 | Com. Ex. 5 |
|---|---|---|---|---|---|---|---|---|
| (A-1-1) + (B-1) | 45 | 47 | 42 | 50 | 45 |  | 45 | 48 |
| (A-1-2) + (B-2) |  |  |  |  |  | 45 |  |  |
| (A-2-1) | 5 | 5 | 4 |  | 5 | 5 |  | 2 |
| (A-2-2) |  |  |  |  |  |  | 5 |  |
| (C-1) | 30 |  | 39 |  |  |  |  |  |
| (C-2) |  | 30 |  | 25 |  | 30 | 30 | 30 |
| (D-1) | 20 |  | 17 | 25 | 20 |  |  |  |
| (D-2) |  | 18 |  |  |  |  | 20 | 20 |
| (D-3) |  |  |  |  | 30 |  |  |  |
| Erucamide | 0.05 | 0.05 | 0.05 | 0.05 | 0.05 | 0.05 | 0.05 | 0.05 |
| Antioxidant 1 | 0.2 | 0.2 | 0.2 | 0.2 | 0.2 | 0.2 | 0.2 | 0.2 |
| Antioxidant 2 | 0.1 | 0.1 | 0.1 | 0.1 | 0.1 | 0.1 | 0.1 | 0.1 |
| Light stabilizer 1 | 0.2 | 0.2 | 0.2 | 0.2 | 0.2 | 0.2 | 0.2 | 0.2 |

TABLE 1-continued

|  |  | Ex. 1 | Ex. 2 | Ex. 3 | Com. Ex. 1 | Com. Ex. 2 | Com. Ex. 3 | Com. Ex. 4 | Com. Ex. 5 |
|---|---|---|---|---|---|---|---|---|---|
| Light stabilizer 2 |  | 0.1 | 0.1 | 0.1 | 0.1 | 0.1 | 0.1 | 0.1 | 0.1 |
| Light stabilizer 3 |  | 0.1 | 0.1 | 0.1 | 0.1 | 0.1 | 0.1 | 0.1 | 0.1 |
| Preservative |  | 0.2 | 0.2 | 0.2 | 0.2 | 0.2 | 0.2 | 0.2 | 0.2 |
| Inorganic filler |  | 0.6 | 0.6 | 0.6 | 0.6 | 0.6 | 0.6 | 0.6 | 0.6 |
| $[\eta]A$ | dl/g | 1.14 | 1.13 | 1.11 | 0.9 | 1.14 | 1.33 | 0.95 | 1 |
| MFR of thermoplastic elastomer composition (230° C.) | g/10 min | 7 | 8 | 8 | 9 | 8 | 8 | 11 | 10 |
| Bending elastic modulus (90° C.) | MPa | 100 | 110 | 100 | 90 | 110 | 100 | 100 | 90 |
| Izod impact strength −45° C. | kJ/m² | 95 | 83 | 85 | 33 | 99 | 72 | 81 | 82 |
|  | NB or B | NB | NB | NB | B | NB | B | B | B |
| Welding strength | MPa | 8 | 8.1 | 8.7 | 8.5 | 7.5 | 7.7 | 7.7 | 8.1 |
| D7 | nm | 97 | 115 | — | — | — | 122 | 119 | 132 |
| D200 | nm | 384 | 445 | — | — | — | 336 | 375 | 374 |
| D200/D7 |  | — | 4 | 3.9 | — | — | — | 2.8 | 3.2 | 2.8 |

DESCRIPTION OF REFERENCE NUMERALS

1: second molded body
2: first molded body
3: welded part

The invention claimed is:

1. A composite molded body in which a first molded body comprising a propylene-based polymer and a second molded body comprising a thermoplastic elastomer composition are welded with each other, wherein when the cross-sectional surface perpendicular to the welding surface is stained with a vapor of ruthenium tetraoxide, the stained domain satisfies requirement (1);

Requirement (1): when the stained cross-sectional surface is observed with a transmission electron microscope, D7 is 115 nm or less,
wherein D7 is a number-average circle-equivalent diameter of the stained domain in a square having a side of 4 µm around a point where the distance from the welded part is 7 µm in a vertical direction, wherein the square presents in the second molded body.

2. The composite molded body according to claim 1, wherein when the cross-sectional surface perpendicular to the welding surface is stained with a vapor of ruthenium tetraoxide, the stained domain satisfies requirement (2);

Requirement (2): when the stained cross-sectional surface is observed with a transmission electron microscope, D200/D7 is 3.5 or more,
wherein D200 is a number-average circle-equivalent diameter of the stained domain in a square having a side of 4 µm around a point where the distance from the welded part is 200 µm in a vertical direction, wherein the square present in the second molded body.

3. The composite molded body according to claim 1, wherein the first molded body and the second molded body are vibrated and welded with each other.

4. An automobile interior part comprising the composite molded body according to claim 1.

* * * * *